United States Patent
Tsou et al.

(10) Patent No.: US 10,752,722 B2
(45) Date of Patent: Aug. 25, 2020

(54) COMPOSITIONS OF ISOBUTYLENE, STYRENE AND STYRENE WITH GRAFT-ON PENDANT DOUBLE BONDS

(71) Applicant: ExxonMobil Chemical Patents Inc., Baytown, TX (US)

(72) Inventors: Andy H. Tsou, Houston, TX (US); Hillary L. Passino, Houston, TX (US); Jennifer L. Rapp, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 178 days.

(21) Appl. No.: 15/987,326

(22) Filed: May 23, 2018

(65) Prior Publication Data

US 2019/0023827 A1  Jan. 24, 2019

Related U.S. Application Data

(60) Provisional application No. 62/536,126, filed on Jul. 24, 2017.

(51) Int. Cl.
| | |
|---|---|
| *C08F 255/10* | (2006.01) |
| *C08F 212/08* | (2006.01) |
| *C08F 236/06* | (2006.01) |
| *C08F 236/08* | (2006.01) |
| *C08F 210/10* | (2006.01) |

(52) U.S. Cl.
CPC .......... *C08F 255/10* (2013.01); *C08F 210/10* (2013.01); *C08F 212/08* (2013.01); *C08F 236/06* (2013.01); *C08F 236/08* (2013.01); *C08F 2800/10* (2013.01)

(58) Field of Classification Search
CPC .............................. C08F 236/08; C08F 255/10
See application file for complete search history.

(56) References Cited

U.S. PATENT DOCUMENTS

| | | | | |
|---|---|---|---|---|
| 3,458,599 | A | * 7/1969 | Kastning ............... | C08F 255/10 525/247 |
| 5,162,445 | A | 11/1992 | Powers et al. | |
| 5,548,023 | A | * 8/1996 | Powers .................... | C08F 8/00 525/192 |

FOREIGN PATENT DOCUMENTS

| | | |
|---|---|---|
| EP | 0 344 021 A | 11/1989 |
| EP | 0 982 286 A | 3/2000 |

* cited by examiner

*Primary Examiner* — Mark S Kaucher

(57) ABSTRACT

A composition and methods for making the same. The composition includes an isoolefin having from 4 to 7 carbons, a first styrene, and a second styrene alkylated with a diene to have a pendant double bond. A copolymer having units derived from an isoolefin having from 4 to 7 carbons and an alkylstyrene can be reacted with a diene to provide the composition. The reaction of the copolymer with the diene can be reacted in the presence of a catalyst at a temperature of about 80° C. to about 200° C.

18 Claims, 1 Drawing Sheet

COMPOSITIONS OF ISOBUTYLENE, STYRENE AND STYRENE WITH GRAFT-ON PENDANT DOUBLE BONDS

CROSS-REFERENCE TO RELATED APPLICATIONS

This application claims priority to U.S. Ser. No. 62/536,126, filed Jul. 24, 2017, herein incorporated by reference.

FIELD OF THE INVENTION

Embodiments provided herein generally relate to rubbers and methods for making same. More particularly, embodiments provided herein relate to compositions of an isoolefin, alkyl styrene, and alkyl styrene with pendant double bonds and methods for making same.

BACKGROUND OF THE INVENTION

Butyl rubbers, which are copolymers of isobutylene and isoprene, have been around since the 1930s. Butyl is a crosslinkable thermoset rubber with majority polyisobutylene (PIB) so to have the excellent damping and exceptional impermeable properties of PIB. The commercial process to make butyl rubber involves cationic copolymerization of isobutylene and isoprene in methyl chloride diluent using aluminum chloride initiating system.

Isoprene, a conjugated diene, was added to butyl rubber as a co-monomer to make the resulting rubber crosslinkable. Isobutylene is perfectly suited for cationic polymerization with the formation of tert-butyl cations after its protonation, but isoprene is not. Therefore, the isoprene content within a butyl rubber is limited, if it is incorporated by cationic copolymerization using an aluminum chloride initiator. The isoprene content is typically below 5 mole %, and mostly below 3 mole %. Moreover, the double bond of the resulting polymer is in the backbone, so its accessibility is restricted leading to slow curing (or crosslinking) kinetics.

Despite excellent impermeability, butyl rubber lacks polarity, which renders it highly immiscible, incompatible, and non-adherent to other general purpose rubbers (GPRs) of NR (natural rubber), BR (butadiene rubber), and SBR (styrene-butadiene rubber). Butyl rubbers are thus used as inner tubes, curing bladders, and curing envelope where non-stickiness is desired. The invention of bromobutyl and chlorobutyl in the 1960s, by halogenation of butyl rubbers, introduced tubeless tires, using innerliners instead of innertubes. Halogenation of the backbone double bonds on the isoprene co-monomer improved the polarity and converted the backbone double bond to allylic bromine for faster cure process. The higher polarity of BIIR (bromobutyl) and CIIR (chlorobutyl) allow their innerliner green compound sheets, prior to curing, to stick to the tire carcass for forming the innerliner layer. Improving their compatibility with GPR made it possible to use HIIR (halogenated butyl)/NR blends as innerliners and to add HIIR into tire tread compounds based on SBR, BR, and NR.

To further enhance oxidative and thermal stability of HIIR, copolymers of isobutylene and para-methyl styrene were introduced in late 1980s (European Patent No. 0344021) with no backbone or pendant unsaturations. Para-methyl styrene (PMS) was used due to its high cationic polymerizability, better than styrene, and both PMS and styrene have high cationic polymerization reactivity than that of isobutylene. High PMS incorporation in IMS (isobutylene-p-methylstyrene copolymer) became possible with PMS contents greater than 10 mole % and can reach to 90% PMS. However, the IMS component is not crosslinkable. Later, by radical bromination of the PMS moiety to generate benzyl bromide functionality, a crosslinkable BIMS (brominated IMS) was discovered (U.S. Pat. No. 5,162,445). This radical bromination process is slow and requires the use, and associated capital expenditures, of several residence tank reactors to increase the reaction time, allowing bromination process to complete. Additionally, benzyl bromides are highly reactive and specific care must be exercised to prevent compound scorching, gelling, and nerving during processing. Additionally, the bromination extent is very low due to radical bromination difficulty. Typical bromination level in a BIMS, and the resulting crosslinking level, that can be delivered economically is below 2 mole % despite the fact that one can incorporate greater than 10 mole % of PMS.

Limited unsaturations in butyls and their low polarity restrict their uses to innertubes and bladders. Halogenation of butyls leads to HIIR with higher polarity but without increasing their crosslinking sites and raising their crosslinking density. This polarity enhancement by halogenation expanded their uses with HIIR being the preferred material of choice for tire innerliners. However, there are almost no uses of HIIR in tire sidewall and tread compounds. The PIB based copolymers are prone to wear and have low elasticity, which are the limiting factors for their use in treads and in sidewalls. This propensity to wear and the low elasticity can be mitigated by raising the crosslinking density. Although one can incorporate a lot more PMS than isoprene in IMS than in butyl rubber, the PMS bromination difficulty resulting in a BIMS with still low crosslinkability while the BrPMS renders BIMS a lot more scorchy and difficult to handle, process, and store.

Accordingly, a need exists for isobutylene based copolymers that are of high polarity and crosslinkability while possessing less reactive crosslinking sites for ease of processing, scorch safety, long shelf life, and minimal Marching Mooney.

SUMMARY OF THE INVENTION

A composition and methods for making the same are provided.

The composition includes an isoolefin having from 4 to 7 carbons, a first styrene component, and a second styrene component that is alkylated with a diene to have one or more pendant double bonds.

In another embodiment, the composition includes the reaction product of a copolymer of an isoolefin having from 4 to 7 carbons and a first styrene and a diene.

In another embodiment, the polymer comprises a copolymer of an isoolefin having from 4 to 7 carbons and a first styrene grafted to a diene.

One method for making the composition includes reacting (1) a copolymer having units derived from an isoolefin having from 4 to 7 carbons and an alkylstyrene with (2) a diene. The reaction of the copolymer with the diene can be performed in the presence of a catalyst at a temperature of about 80° C. to about 200° C.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
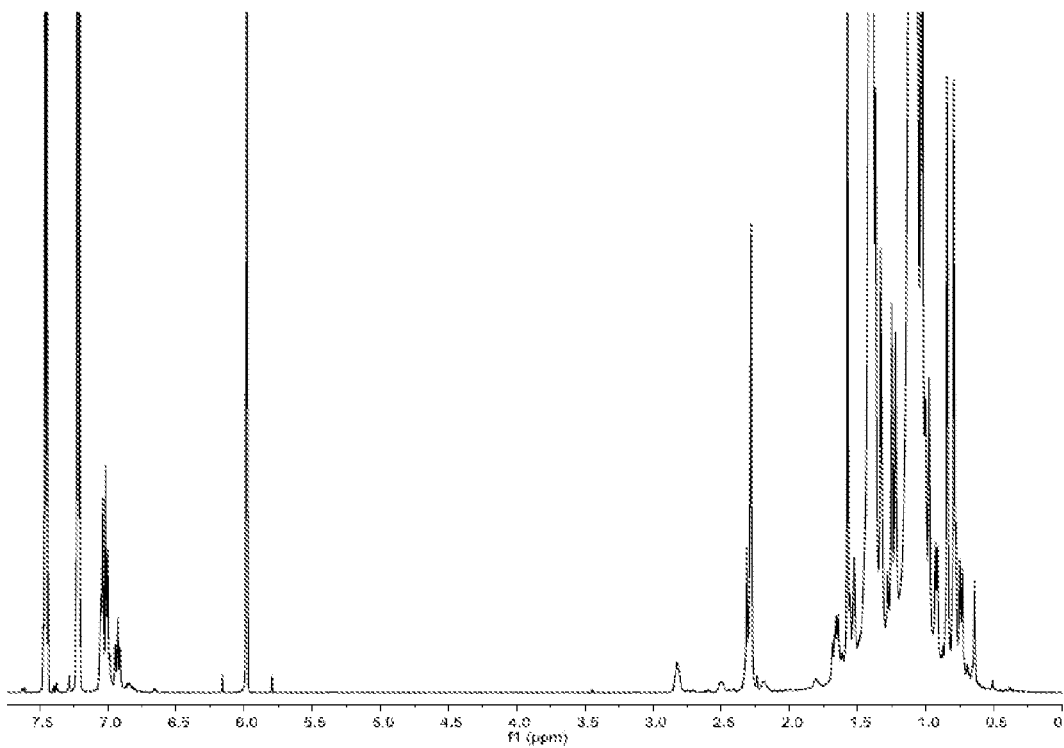
FIG. 1 depicts the proton nuclear magnetic resonance ($^1$H NMR) characterization of the product (IMS-g-isoprene) of Example 1.

Compositions exhibiting high polarity and crosslinkability while possessing less reactive crosslinking sites for ease of processing, scorch safety, long shelf life, and minimal Marching Mooney are provided. The compositions include an isoolefin and both styrene and styrene with one or more graft-on pendant double bonds. The composition is a direct result of alkylating the styrene component derived from random copolymers of an isoolefin-styrene with one or more dienes. The one or more dienes can be conjugated or nonconjugated, and can be a mixture of both.

The random copolymers of the isoolefin-styrene can have a copolymer backbone of an isoolefin having from 4 to 7 carbon atoms and styrene (the "first styrene"). In certain embodiments, the random copolymers of the isoolefin-styrene can have a copolymer backbone of an isoolefin having from 4 to 7 carbon atoms and para-alkylstyrene having the formula:

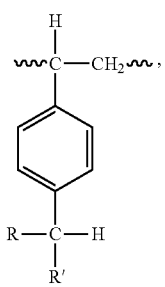

(I)

wherein R and R' are independently selected from the group consisting of hydrogen, alkyl preferably having from 1 to 5 carbon atoms, and mixtures thereof. Preferred copolymers satisfying Formula (I) include copolymers of an isomonoolefin having from 4 to 7 carbon atoms and a para-alkylstyrene, such as those described in European Patent Application No. 89305395.9 filed May 26, 1989, (Publication No. 0344021 published Nov. 29, 1989). Most useful of such copolymer materials are elastomeric random interpolymers of isobutylene and from about 0.5 to about 20 wt %, preferably from about 1 to about 20 wt %, more preferably from about 2 to about 20 wt %, alkylstyrene, preferably para-methylstyrene. These interpolymers are termed "poly(isobutylene-co-p-methylstyrene)", abbreviated as IMSM, and are used as precursors for commercially available EXXPRO™ elastomers, which are commercially available from ExxonMobil Chemical Company, Houston, Tex.

Suitable copolymers preferably have a substantially homogeneous compositional distribution such that at least about 95% by weight of the copolymer has an alkylstyrene content to about 10% of the alkylstyrene content of the copolymer. More preferred copolymers are also characterized by a narrow molecular weight distribution (Mw/Mn) of less than about 5, more preferably less than about 3.5, a preferred viscosity average molecular weight in the range of from about 200,000 g/mole up to about 2,000,000 g/mole and a preferred number average molecular weight in the range of from about 25,000 g/mole to about 750,000 g/mole.

The intercompositional distribution of suitable copolymers can also be substantially homogeneous. That is, these copolymers can be essentially random copolymers, and in any particular polymer chain, the alkylstyrene and isoolefin units can be randomly distributed throughout that chain.

Various methods can be used to produce these copolymers, such as those described in European Patent Application No. 89305395.9. For example, preferred copolymers of isomonoolefins and para-alkylstyrene can be produced by admixing the isomonoolefin and the para-alkylstyrene in a copolymerization reactor under copolymerization conditions in the presence of a diluent and a Lewis acid catalyst.

Suitable dienes can be or can include any one or more conjugated dienes, such as isoprene, butadiene, and 1,3-pentadiene (or piperylene), for example. Suitable dienes can also be or can include any one or more nonconjugated dienes, such as 1,8 decadiene, and 1,4 hexadiene. The diene component can also be or can include any one or more cyclic unconjugated dienes such as ethylidene norbornene, 1,5 cyclooctadiene, norbornadiene, and dicyclopentadiene.

The composition can be synthesized using a Friedel-Crafts alkylation process in a solution or solid state (such as in extruder) reaction. The reaction between the second styrene component of the copolymer can be facilitated with a catalyst at a temperature within the range from a low of about 80° C., about 90° C., or about 100° C. to a high of about 140° C., about 160° C., about 180° C. or about 200° C.

The catalyst can be generally acidic, and can be homogeneous or heterogeneous. Examples of suitable acidic heterogeneous catalysts include silico-aluminates (e.g., zeolites, alumina, and silico-alumino-phosphate), sulfated zirconia, transition metal oxides (e.g., titania, zirconia, and niobia oxides), sulfonated polystyrene, solid phosphoric acid, niobic acid, and hetropolyoxometallates. Especially preferred catalysts are Lewis acids. Suitable Lewis acids include methanesulfonic acid (MSA), AlCl$_3$, FeCl$_3$, GaCl$_3$, BF$_3$, SbCl$_5$, BiCl$_3$Bi(OTf)$_3$, and trifluoromethanesulfonic acid (triflic acid).

Preferably, the copolymer backbone and the dienes are reacted in solution. Suitable solvents include high boiling saturated aliphatic hydrocarbons (C8 to C20), halogenated aliphatic hydrocarbons (C1 to C8), aryl hydrocarbons (C6 to C20), and halogenated aryl hydrocarbons (C6 to C20). Particularly preferred solvents include dodecane, toluene, xylenes, and ortho-dichloro benzene (ODCB).

In a preferred embodiment, at least some of the para-methylstyrene of an isobutylene-para methylstyrene copolymer is alkylated by Friedel Crafts alkylation with isoprene or butadiene to provide isobutylene-para methylstyrene copolymers with pendant tri-substituted double bonds or vinylenes. This alkylation is fast and efficient and can be done in a conventional bromination reactor used to make BIMS. With the high incorporation amount of PMS in IMS, the unsaturation level can be raised by alkylating the IMS copolymer. At the same time, this conjugated addition to the carbocation during alkylation leads to a pendant double bond that is not terminal. In the case of isoprene, trisubstituted double bonds will be present after the alkylation reaction, opposed to vinylenes when butadiene is alkylated. By moving the double bond one carbon away from the pendant chain end, the composition exhibits lower reactivity, prolonged shelf life, and minimizes the potential marching Mooney (slow crosslinking with time during storage). For the same reason, 1,8 decadiene and 1,4 hexadiene are preferred un-conjugated linear dienes and ethylidene norbornene (ENB) is the preferred un-conjugated cyclic diene since all would lead to lead to less-reactive pendant double bonds at one carbon away from the chain end after alkylation.

The alkyl styrene monomer (the "second styrene") provides polarity and the grafted pendant tri-substituted double bonds or vinylenes offer ease of crosslinking and shelf stability to the composition product of isobutylene, alkyl styrene that does not have a graft-on pendant double bond, and alkyl styrene with one or more graft-on pendant double bonds. These compositions are mostly preferred when high crosslinking density, polarity, and no halogens are desired in isobutylene copolymers for applications in tire innerliners, sidewalls, and treads and in pharmaceutical stoppers, engine and exhaust mounts.

The isobutylene content of the composition can range from about 20 mole % to about 99 mole %, the balance being the styrene that does not have a graft-on pendant double bond and the styrene that has one or more graft-on pendant double bonds. For example, the isobutylene content of the composition can range from a low of about 20 mole %, about 30 mole %, or about 44 mole % to a high of about 80 mole %, about 90 mole %, about 98 mole %, or about 99 mole %, with the balance being the styrene that does not have a graft-on pendant double bond and the styrene that has one or more graft-on pendant double bonds. The isobutylene content of the composition can also range from a low of about 20 mole %, about 34 mole %, or about 48 mole % to a high of about 60 mole %, about 76 mole % or about 98 mole %, with the balance being the styrene that does not have a graft-on pendant double bond and the styrene that has one or more graft-on pendant double bonds.

The content of styrene that does not have a graft-on pendant double bond can range from a low of about 0.5 mole %, about 1 mole %, about 5 mole %, or about 10 mole % to a high of about 25 mole %, about 37 mole % or about 40 mole %, with the balance being isobutylene and the styrene that has one or more graft-on pendant double bonds. The content of styrene that does not have a graft-on pendant double bond also can range from a low of about 2 mole %, about 8 mole %, or about 15 mole % to a high of about 30 mole %, about 35 mole % or about 40 mole %, with the balance being isobutylene and the styrene that has one or more graft-on pendant double bonds.

The content of the styrene that has one or more graft-on pendant double bonds can range from a low of about 0.5 mole %, about 1 mole %, about 3 mole %, or about 5 mole % to a high of about 20 mole %, about 30 mole % or about 40 mole %, with the balance being isobutylene and the styrene that does not have a graft-on pendant double bond. The content of the styrene that has one or more graft-on pendant double bonds also can range from a low of about 2.5 mole %, about 8 mole %, or about 12 mole % to a high of about 26 mole %, about 32 mole % or about 40 mole %, with the balance being the isobutylene and styrene that does not have graft-on pendant double bond constituents.

Rubber Compounds

A rubber compound composition is also provided. The rubber compound composition can include up to 90 wt % of the composition described herein. In one or more embodiments, the rubber compound composition also can contain of from 0.5 to 50 wt % of one or more diene elastomers. In one or more embodiments, the rubber compound composition can further contain of from 0.5 to 50 wt % inorganic fillers. In one or more embodiments, the rubber compound composition can further contain of from 0.1 to 5 wt % curatives. In one or more embodiments, the rubber compound composition can further contain of from 0.5 to 20 wt % processing oil.

Diene Elastomers

The term "diene elastomer" refers to an elastomer resulting at least in part (homopolymer or copolymer) from diene monomers (monomers bearing two double carbon-carbon bonds, whether conjugated or not). A diene elastomer can be "highly unsaturated," resulting from conjugated diene monomers, which have a greater than 50% molar content of units.

The diene elastomer can have a Tg from −75° C. to −40° C. and can be selected from the group consisting of styrenebutadiene copolymers, natural polyisoprenes, synthetic polyisoprenes having a cis-1,4 linkage content greater than 95%, styrene/butadiene/isoprene compositions and a mixture of these elastomers. The diene elastomer also can have a Tg from −110° C. to −75° C., preferably from −100° C. to −80° C., and can be selected from the group consisting of polybutadienes having a cis-1,4 linkage content greater than 90% and isoprene/butadiene copolymers comprising butadiene units in an amount equal to or greater than 50%. The diene elastomer also can have a Tg from −75° C. to −40° C. and can be selected from the group consisting of natural polyisoprenes and synthetic polyisoprenes having a cis-1,4 linkage content greater than 95%, and each diene elastomer having a Tg from −110° C. to −75° C. is a polybutadiene having a cis-1,4 linkage content greater than 90%.

In one embodiment, the rubber composition comprises a blend of the diene elastomer(s) having a Tg from −75° C. to −40° C. and each of the diene elastomer(s) having a Tg from −110° C. to −75° C. In one aspect, the rubber composition comprises a blend of at least one of the polybutadienes having a cis-1,4 linkage content greater than 90% with at least one of the natural or synthetic polyisoprenes (having a cis-1,4 linkage content greater than 95%). In another aspect, the rubber composition comprises a blend of at least one of the polybutadienes having a cis-1,4 linkage content greater than 90% with at least one of the compositions of styrene, isoprene and butadiene.

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used herein is understood more particularly to mean: (a) any homopolymer obtained by polymerization of a conjugated diene monomer having from 4 to 12 carbon atoms; (b) any copolymer obtained by copolymerization of one or more conjugated dienes with one another or with one or more vinylaromatic compounds having from 8 to 20 carbon atoms; (c) a ternary copolymer obtained by copolymerization of ethylene and of an alpha-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene; (d) a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di(C1-C5 alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise from 99% to 20% by weight of diene units and from 1% to 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol end (such as described, for example, in France Patent No. 2 740 778 or U.S. Pat. No. 6,013,718), alkoxysilane groups (such as described, for example, in France Patent No. 2 765 882 or U.S. Pat. No. 5,977,238), carboxyl groups (such as described, for example, in International Patent No. WO 01/92402 or U.S. Pat. No. 6,815,473, International Patent No. WO 2004/096865 or U.S. Patent Application No. 2006/0089445) or polyether groups (such as described, for example, in European Patent No. 1 127 909 or U.S. Pat. No. 6,503,973).

The following are suitable: polybutadienes, in particular those having a content (molar %) of 1,2-units of from 4% to 80% or those having a content (molar %) of cis-1,4-units of greater than 80%, polyisoprenes, butadiene/styrene copolymers and in particular those having a Tg (glass transition temperature, measured according to Standard ASTM D3418) of from 0° C. to −70° C. and more particularly from −10° C. to −60° C., a styrene content of from 5% to 60% by weight and more particularly from 20% to 50%, a content (molar %) of 1,2-bonds of the butadiene part of from 4% to 75% and a content (molar %) of trans-1,4-bonds of from 10% to 80%, butadiene/isoprene copolymers, in particular those having an isoprene content of from 5% to 90% by weight and a Tg of −40° C. to −80° C., or isoprene/styrene copolymers, in particular those having a styrene content of from 5% to 50% by weight and a Tg of from −25° C. to −50° C. In the case of butadiene/styrene/isoprene copolymers, those having a styrene content of from 5% to 50% by weight and more particularly of from 10% to 40%, an isoprene content of from 15% to 60% by weight and more particularly from 20% to 50%, a butadiene content of from 5% to 50% by weight and more particularly of from 20% to 40%, a content (molar %) of 1,2-units of the butadiene part of from 4% to 85%, a content (molar %) of trans-1,4-units of the butadiene part of from 6% to 80%, a content (molar %) of 1,2- plus 3,4-units of the isoprene part of from 5% to 70% and a content (molar %) of trans-1,4-units of the isoprene part of from 10% to 50%, and more generally any butadiene/styrene/isoprene copolymer having a Tg of from −20° C. to −70° C., are suitable in particular.

The diene elastomer chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

According to a specific embodiment, the diene elastomer is predominantly (i.e., for more than 50 wt %) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of from 20% to 35% by weight, or a high styrene content, for example from 35 to 45%, a content of vinyl bonds of the butadiene part of from 15% to 70%, a content (molar %) of trans-1,4-bonds of from 15% to 75% and a Tg of from −10° C. to −55° C.; such an SBR can advantageously be used as a mixture with a BR preferably having more than 90% (molar %) of cis-1,4-bonds.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber IM), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to still another aspect, the rubber composition comprises a blend of a (one or more) "high Tg" diene elastomer exhibiting a Tg of from −70° C. to 0° C. and of a (one or more) "low Tg" diene elastomer exhibiting a Tg of from −110° C. to −80° C., more preferably from −100° C. to −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

The compositions described herein can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.
Inorganic Filler The term "filler" as used herein refers to any material that is used to reinforce or modify physical properties, impart certain processing properties, or reduce cost of an elastomeric composition.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and range, for example in the tire industry, from 0.0001 μm to 100 rpm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name Zeosil™ Z1165.

Use may be made of any type of reinforcing filler known for its capabilities of reinforcing a rubber composition which can be used for the manufacture of tires, for example an organic filler, such as carbon black, a reinforcing inorganic filler, such as silica, or a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in the isoprene elastomer in the form of a masterbatch (see, for example, Applications International Patent Application No. WO 97/36724 or WO 99/16600).

Mention may be made, as examples of organic fillers other than carbon blacks, of the functionalized polyvinylaromatic organic fillers as described in International Patent Application Nos. WO-A-2006/069792 and WO-A-2006/069793.

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 m²/g, preferably from 30 to 400 m²/g. Mention will be made, as highly dispersible ("HDS") precipitated silicas, for example, of the Ultrasil 7000 and Ultrasil 7005 silicas from Degussa, the Zeosil 1165 MP, C5 MP and 1115 MP silicas from Rhodia, the Hi-Sil EZ150G silica from PPG, the Zeopol 8715, 8745 and 8755 silicas from Huber or the silicas with a high specific surface as described in International Patent Application No. WO 03/16837.

Mention may also be made, as other examples of inorganic filler being capable of being used, of reinforcing aluminum (oxide), hydroxides, titanium oxides or silicon carbides (see, for example, International Patent Application No. WO 02/053634 or U.S. Patent Application No. 2004/0030017).

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (II):

$$Z-A-S_x-A-Z \qquad (II),$$

in which x is an integer from 2 to 8 (preferably from 2 to 5); the A symbols, which are identical or different, represent a divalent hydrocarbon radical (preferably a C1-C18 alkylene group or a C6-C12 arylene group, more particularly a C1-C10, in particular C1-C4, alkylene, especially propylene); the Z symbols, which are identical or different, correspond to one of the three formula (III):

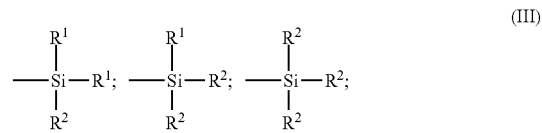

in which the R1 radicals, which are substituted or unsubstituted and identical to or different from one another, represent a C1-C18 alkyl, C5-C18 cycloalkyl or C6-C18 aryl group (preferably C1-C6 alkyl, cyclohexyl or phenyl groups, in particular C1-C4 alkyl groups, more particularly methyl and/or ethyl); the R2 radicals, which are substituted or unsubstituted and identical to or different from one another, represent a C1-C18 alkoxyl or C5-C18 cycloalkoxyl group (preferably a group selected from C1-C8 alkoxyls and C5-C8 cycloalkoxyls, more preferably still a group selected from C1-C4 alkoxyls, in particular methoxyl and ethoxyl).

International Patent Application Nos. WO 03/002648 and WO 03/002649 further disclose silane polysulfides. Nonlimiting examples of silane polysulphides include bis((C1-C4)alkoxy(C1-C4)alkylsilyl(C1-C4)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)tetrasulphide, abbreviated to TESPT, of formula [(C2H5O)3Si(CH2)3S2]2, or bis(triethoxysilylpropyl)disulphide, abbreviated to TESPD, of formula [(C2H5O)3Si(CH2)3S]2. Other examples include bis(mono(C1-C4)alkoxyldi(C1-C4)alkylsilylpropyl) polysulphides (in particular disulphides, trisulphides or tetrasulphides), more particularly bis(monoethoxydimethylsilylpropyl)tetrasulphide, such as described in International Patent Application No. WO 02/083782.

The coupling agent can also be bifunctional POSs (polyorganosiloxanes), or hydroxysilane polysulphides, as described in International Patent Application Nos. WO 02/30939, WO 02/31041 and WO2007/061550, or silanes or POSs bearing azodicarbonyl functional groups, as described in International Patent Application Nos. WO 2006/125532; WO 2006/125533; and WO 2006/125534. The coupling agent can also include other silane sulphides, for example, silanes having at least one thiol (—SH) functional group (referred to as mercaptosilanes) and/or at least one masked thiol functional group, as described in U.S. Pat. No. 6,849,754, and International Patent Application Nos. WO 99/09036; WO 2006/023815; WO 2007/098080; WO 2008/055986; and WO 2010/072685.

The coupling agent can also include combinations of one or more coupling agents described herein, as further described in International Patent Application No. WO 2006/125534. A preferred coupling agent comprises alkoxysilane or polysulphurized alkoxysilane. A particularly preferred polysulphurized alkoxysilane is bis(triethoxysilylpropyl)tetrasulphide, which is commercially available by Degussa under the trade name X50S™.

Processing Oil

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name Nytex™ 4700.

MES and TDAE oils are well known to a person skilled in the art; for example, reference is made to publication KGK (Kautschuk Gummi Kunstoffe), 52nd year, No. 12/99, pp. 799-805, entitled "Safe Process Oils for Tires with Low Environmental Impact". Patent applications disclosing the use of such oils, as a substitute for conventional aromatic oils, are, for example, European Patent No. 1 179 560 (or U.S. Patent Application No. 2002/0045697) or European Patent No. 1 270 657.

Mention may be made, as examples of MES oils (whether they are of the "extracted" or "hydrotreated" type) or of TDAE oils, for example, of the products sold under the names "Flexon 683" by ExxonMobil, "Vivatec 200" or "Vivatec 500" by H&R European, "Plaxolene MS" by Total, or "Catenex SNR" by Shell.

The resins (it should be remembered that the term "resin" is reserved by definition for a solid compound) formed of C5 fraction/vinylaromatic copolymer, in particular of C5 fraction/styrene or C5 fraction/C9 fraction copolymer, are well known; they have been essentially used to date for application as tackifying agents for adhesives and paints but also as processing aids in tire rubber compositions.

The C5 fraction/vinylaromatic copolymer is, by definition and in a known way, a copolymer of a vinylaromatic monomer and of a C5 fraction.

Styrene, alpha-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene and any vinylaromatic monomer resulting from a C9 fraction (or more generally from a C8 to C10 fraction), for example, are suitable as vinylaromatic monomers. Preferably, the vinylaromatic compound is styrene or a vinylaromatic monomer resulting from a C9 fraction (or more generally from a C8 to C10 fraction).

In a known way, the term C5 fraction (or, for example, C9 fraction respectively) is understood to mean any fraction resulting from a process resulting from petrochemistry or from the refining of petroleums, any distillation fraction predominantly comprising compounds having 5 (or respectively 9, in the case of a C9 fraction) carbon atoms; the C5 fractions, for example, may comprise, by way of illustration and without limitation, the following compounds, the relative proportions of which may vary according to the process by which they are obtained, for example according to the origin of the naphtha and the steam cracking process: 1,3-butadiene, 1-butene, 2-butenes, 1,2-butadiene, 3-methyl-1-butene, 1,4-pentadiene, 1-pentene, 2-methyl-1-butene, 2-pentenes, isoprene, cyclopentadiene, which can be present in the form of its dicyclopentadiene dimer, piperylenes, cyclopentene, 1-methylcyclopentene, 1-hexene, methylcyclopentadiene or cyclohexene. These fractions may be obtained by any chemical process known in the petroleum industry and petrochemistry. Mention may be made, as nonlimiting examples, of processes for the steam cracking of naphtha or processes for the fluid catalytic cracking of gasolenes, it being possible for these processes to be combined with any possible chemical treatment for the conversion of these fractions known to a person skilled in the art, such as hydrogenation and dehydrogenation.

Preferably, in the C5 fraction/vinylaromatic copolymer (in particular C5 fraction/styrene or C5 fraction/C9 fraction copolymer), the vinylaromatic compound (in particular styrene or C9 fraction) is the minor monomer, expressed as molar fraction. Thus, more preferably, the percentage of aromatic protons (with regard to the total number of protons of the copolymer), determined in a known way by NMR analysis, is less than 50%, more preferably from 1% to 25% (mol %).

Antioxidant

As used herein, the term "antioxidant" refers to a chemical that combats oxidative degradation. Suitable antioxidants include diphenyl-p-phenylenediamine and those disclosed in The Vanderbilt Rubber Handbook (1978), Pages 344 to 346. A particularly preferred antioxidant is para-phenylenediamines, which is commercially available by Eastman under the trade name Santoflex™ 6PPD (N-(1,3-Dimethylbutyl)-N'-phenyl-1,4-phenylenediamine).

Crosslinking Agents, Curatives, Cure Packages, and Curing Processes

The rubber compound compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A preferred curing agent is sulfur.

Processing

A suitable tire tread composition utilizing a rubber compound composition described herein can be compounded (mixed) by any conventional means known to those skilled in the art. The mixing can occur in a single step or in multiple stages. For example, the ingredients can be mixed in at least two stages, namely at least one non-productive stage followed by a productive mixing stage. The terms "non-productive" and "productive" mix stages are well known to those having skill in the rubber mixing art. The elastomers, polymer additives, silica and silica coupler, and carbon black, are generally mixed in one or more non-productive mix stages. Most preferably, the polymers can be mixed first at 110° C. to 130° C. for 30 seconds to 2 minutes, followed by addition of the silica, silica coupler and other ingredients, the combination of which is further mixed, most preferably at an increasing temperature up to 140° C. to 160° C. for 30 seconds to 3 or 4 minutes. Most desirably the silica is mixed in portions, most preferably one half, then the second half. The final curatives can be mixed in the productive mix stage. In the productive mix stage, the mixing can occur at a temperature, or ultimate temperature, lower than the mix temperature(s) of the preceding non-productive mix stage(s).

The foregoing discussion can be further described with reference to the following non-limiting example.

Example

A copolymer of isobutylene and methyl styrene ("IMS") having 195,000 g/mole Mn, 398,000 g/mole Mw, 2.0 PDI, 2.4 mole % PMS, was obtained from ExxonMobil Chemical. To this copolymer was added isoprene (Sigma Aldrich, CAS #78-79-5, retarders stripped, stored in a dark refrigerator) and methanesulfonic acid (MSA, CAS 75-75-2, Sigma Aldrich) catalyst. Under nitrogen protection, the IMS was fully dissolved in 500 mL anhydrous o-DCB in a 3-neck round bottom 1 Liter flask equipped with a condenser and a stirrer at 120° C.

After the IMS was fully dissolved, isoprene liquid was injected and the MSA catalyst was slowly added. The solution temperature was then raised to the reflux temperature of ODCB (BP=180.5° C.). The reaction was allowed to run at that reflux temperature for 4 hours at reflux and under nitrogen protection. Afterward, the reaction solution was added into 1-Liter of methanol to allow the recovery of the polymer by precipitation. The recovered polymer was then filtered and washed with hexane multiple times to remove all unreacted isoprene. The final product was dried in a vacuum oven at 60° C. overnight, until reaching a constant weight.

Figure 2:
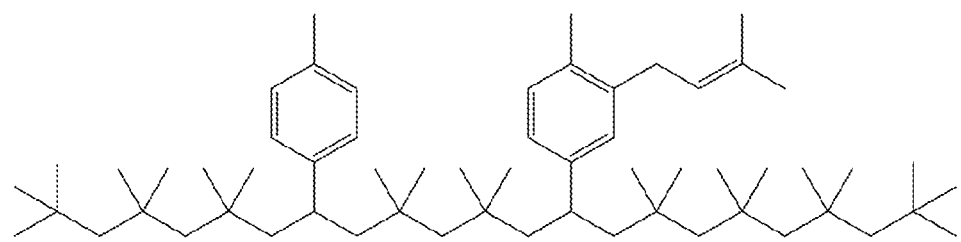
FIG. 2 depicts the structure of the composition product (IMS-g-isoprene) of Example 1.

The product (IMS-g-isoprene) was characterized by proton nuclear magnetic resonance ($^1$H NMR) and compared to the starting material. Nuclear magnetic resonance (NMR) spectra were acquired using a Bruker 500 MHz spectrometer referenced to a residual solvent peak. The samples were dissolved in 1,1,2,2-tetrachloroethane-$d_2$ (TCE-$d_2$). As shown in FIG. 1, 54% of the PMS in the composition contained the grafted on isoprene. Accordingly, the resulting composition had 1.1 mole % PMS and 1.3 mole % PMS with pendant double bonds. Based on the NMR peak shift analysis, the final structure of the composition is shown in FIG. 2 where a tri-substituted double bond can be found on the attached isoprene.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A composition comprising:
   an isoolefin having from 4 to 7 carbons;
   a first styrene; and
   a second styrene alkylated with a diene to have a pendant double bond;
   wherein the double bond is at one carbon away from the terminal carbon of the pendant double bond.

2. The composition of claim 1, wherein the diene is conjugated.

3. The composition of claim 1, wherein the diene is unconjugated and non-cyclic.

4. The composition of claim 3, wherein the diene is 1,4 hexadiene, 1,6 octadiene, 1,8 decadiene, or a combination thereof.

5. The composition of claim 1, wherein the first styrene is 0.5 mole % to 40 mole % of the composition based on the composition.

6. The composition of claim 1, wherein the second styrene alkylated with a diene to have a pendant double bond is 0.5 mole % to 40 mole % of the composition based on the composition.

7. The composition of claim 1, wherein the isoolefin content is 20 mole % to 99 mole % of the composition based on the composition.

8. The composition of claim 1, wherein the first styrene does not have a graft-on pendant double bond, and the second styrene has one or more graft-on pendant double bonds.

9. The composition of claim 1, wherein the first styrene and the second styrene are both an alkyl styrene.

10. The composition of claim 1, wherein the first styrene is p-methylstyrene and the isoolefin having from 4 to 7 carbons comprises isobutylene.

11. The composition of claim 1, wherein the second styrene is p-methylstyrene.

12. The composition of claim 1, wherein both the first styrene and the second styrene is p-methylstyrene.

13. An article comprising the composition of claim 1.

14. A method for producing a composition, comprising:
reacting (i) a copolymer comprising units derived from an isoolefin having from 4 to 7 carbons and an alkylstyrene and (ii) a diene,
wherein the reaction of the copolymer with the diene is facilitated with a catalyst at a temperature of about 80° C. to about 200° C., and the catalyst is a Lewis acid.

15. The method of claim 14, wherein the alkylstyrene is p-methylstyrene, and the isoolefin having from 4 to 7 carbons comprises isobutylene.

16. The method of claim 14, wherein the composition comprises (a) 0.5 mole % to 40 mole %, based on the composition, of the alkylstyrene with graft-on pendant double bonds from the diene, and (b) 0.5 mole % to 40 mole %, based on the composition, of the alkylstyrene without any graft-on pendant double bonds from the diene.

17. A composition comprising:
an isoolefin having from 4 to 7 carbons;
a first styrene; and
a second styrene alkylated with a diene to have a pendant double bond;
wherein the diene is unconjugated and cyclic.

18. The composition of claim 17, wherein the diene is ethylidene norbornene, vinyl norbornene, dicyclopentadiene, norbornadiene, 1,5 cyclooctadiene, or a combination thereof.

* * * * *